(12) United States Patent
Daoud et al.

(10) Patent No.: US 6,559,382 B2
(45) Date of Patent: May 6, 2003

(54) FIBER OPTIC GUIDES WITH INTEGRATED SECURITY

(75) Inventors: Bassel H. Daoud, Parsippany, NJ (US); David S. Kerr, Morris Plains, NJ (US); Ivan Pawlenko, Holland, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/855,396

(22) Filed: May 15, 2001

(65) Prior Publication Data

US 2002/0170734 A1 Nov. 21, 2002

(51) Int. Cl.[7] ............................................. H02G 3/00
(52) U.S. Cl. ................. 174/72 A; 174/71 R; 174/99 R; 174/68.3; 174/72 R
(58) Field of Search .............................. 174/72 A, 71 R, 174/99 R, 68.3, 72 R, 50.6, 65 R; 220/3.2, 3.7, 4.02

(56) References Cited

U.S. PATENT DOCUMENTS

| | | | | |
|---|---|---|---|---|
| 1,384,437 A | * | 7/1921 | Edelmann | .................. 248/68.1 |
| 2,896,009 A | * | 7/1959 | Caveney | ..................... 138/103 |
| 2,963,895 A | * | 12/1960 | Thomas | ...................... 292/288 |
| 4,355,198 A | * | 10/1982 | Gartland, Jr. | ................ 174/66 |
| 4,439,896 A | * | 4/1984 | Matsui | ..................... 24/16 PB |
| 5,613,030 A | | 3/1997 | Hoffer et al. | |
| 5,868,362 A | | 2/1999 | Daoud | |
| 5,907,127 A | | 5/1999 | Daoud | |
| 5,910,642 A | | 6/1999 | Daoud | |
| 5,913,650 A | | 6/1999 | Daoud | ........................ 411/410 |
| 5,996,944 A | | 12/1999 | Daoud | |
| 6,006,556 A | * | 12/1999 | Daoud | ..................... 292/251.5 |
| 6,036,040 A | | 3/2000 | Daoud | |
| 6,037,538 A | | 3/2000 | Brooks | |
| 6,118,075 A | | 9/2000 | Baker et al. | |
| 6,127,627 A | | 10/2000 | Daoud | |
| 6,148,133 A | | 11/2000 | Daoud | |
| 6,161,803 A | * | 12/2000 | Daoud | ....................... 174/72 A |
| 6,201,919 B1 | | 3/2001 | Puetz et al. | |
| 6,245,998 B1 | * | 6/2001 | Curry et al. | .............. 174/72 A |

* cited by examiner

Primary Examiner—Dean A. Reichard
Assistant Examiner—Jinhee J. Lee
(74) Attorney, Agent, or Firm—Duane Morris

(57) ABSTRACT

A secure cable trough includes a tray, a retaining member, and an adjustable fastening mechanism. The tray includes a first retaining arm. The retaining member includes a second retaining arm. The retaining member is slideably engaged to the tray. The first retaining arm, the second retaining arm, the tray, and the retaining member define a cavity for housing the cables. The first retaining arm and the second retaining arm extend toward each other and are offset and overlapping. The distance between the first and second retaining arm defines a gap. The gap provides access to cables and allows cables to be inserted and extracted from the trough. The first and second retaining arms inhibit cables housed within the trough from inadvertently falling out. The adjustable fastening mechanism slideably engages and locks the retaining member to the tray. The adjustable fastening mechanism allows the retaining member to be positioned relative to the tray. The size of the gap is proportional to the relative position between the tray and the retaining member.

18 Claims, 8 Drawing Sheets

FIBER OPTIC GUIDES WITH INTEGRATED SECURITY

FIELD OF THE INVENTION

The present invention relates to wiring troughs, and specifically to a wiring trough for accessing and securely housing and protecting telecommunications equipment.

BACKGROUND

Typically, wire troughs are used to house cables routed between various locations, such as routing telecommunication cables between a building entrance protector (BEP) and a building, or between floors of a building. For example, a BEP may provide an interface for cables from a central office of a service provider for distribution throughout the building served by the BEP. Numerous wires and cables typically protrude through the walls of the BEP. To accommodate an uncertain number of cables and wires, troughs are used for retaining and routing the cables and wires.

Enclosures and troughs are often located in accessible areas, such as basements, closets, and offices. Thus, it is desirable to control access to the cables, to prevent acts such as wire tapping, vandalism, and inadvertent damage to the cables. Typical troughs comprise permanent openings on one side of the trough to allow wires and cables to be inserted and removed from the trough. However, this design allows anyone, whether authorized or not, access to the cables. Thus, there is a need for a secure trough for providing access to authorized persons only.

SUMMARY OF THE INVENTION

In one embodiment of the invention, a secure cable trough includes a tray, a retaining member, and an adjustable fastening mechanism. The tray includes a first retaining arm. The retaining member includes a second retaining arm. The retaining member is slideably engaged to the tray. The first retaining arm, the second retaining arm, the tray, and the retaining member define a cavity for housing at least one cable. The first retaining arm and the second retaining arm extend toward each other, are offset and overlapping, and create an adjustable gap. The gap provides access to cables and allows cables to be inserted and extracted from the cavity. The first and second retaining arms inhibit cables housed within the cavity from inadvertently falling out of the cavity. The adjustable fastening mechanism slideably engages and locks the retaining member to the tray. The adjustable fastening mechanism provides for the definition of a relative position between the tray and the retaining member. The size of the gap is in response to the relative position between the tray and the retaining member.

In another embodiment of the invention, a method for accessing and securely retaining cables in a cavity defined by a tray and a retaining member includes loosening an adjustable fastening mechanism for slideably engaging the retaining member to the tray. The tray comprises a first retaining arm. The retaining member comprising a second retaining arm. The first retaining arm and the second retaining arm extend toward each other. The first retaining arm and the second retaining arm are offset and overlapping, and create an adjustable gap. The method also includes positioning the retaining member relative to the tray to provide the gap sufficient to allow insertion and extraction of cables into and out of the cavity. The method includes performing at least one of inserting and extracting at least one cable into and from the cavity. The method includes positioning the retaining member relative to the tray to provide the gap sufficient to inhibit cables housed within the cavity from inadvertently falling out of the cavity. The method includes locking the adjustable fastening mechanism to secure cables housed with the cavity.

BRIEF DESCRIPTION OF THE FIGURES

The invention is best understood from the following detailed description when read in connection with the accompanying drawing. The various features of the drawings may not be to scale. Included in the drawing are the following figures.

DETAILED DESCRIPTION

Access to a trough may be controlled by the type of mechanism used to hold together the parts of the trough. Fastening mechanisms may comprise special security screws to securely lock the trough, thereby restricting access to only those individuals who have special tools designed to remove those security screws. Two such types of security screws are 216-type screws and KS-type screws. KS-type screws and 216-type screws are described in U.S. Pat. No. 5,913,650, issued to Daoud. A regular slotted-head screw, Phillips-head screw, Allen screw, or bolt may also be used to lock the enclosure.

Figure 1A:
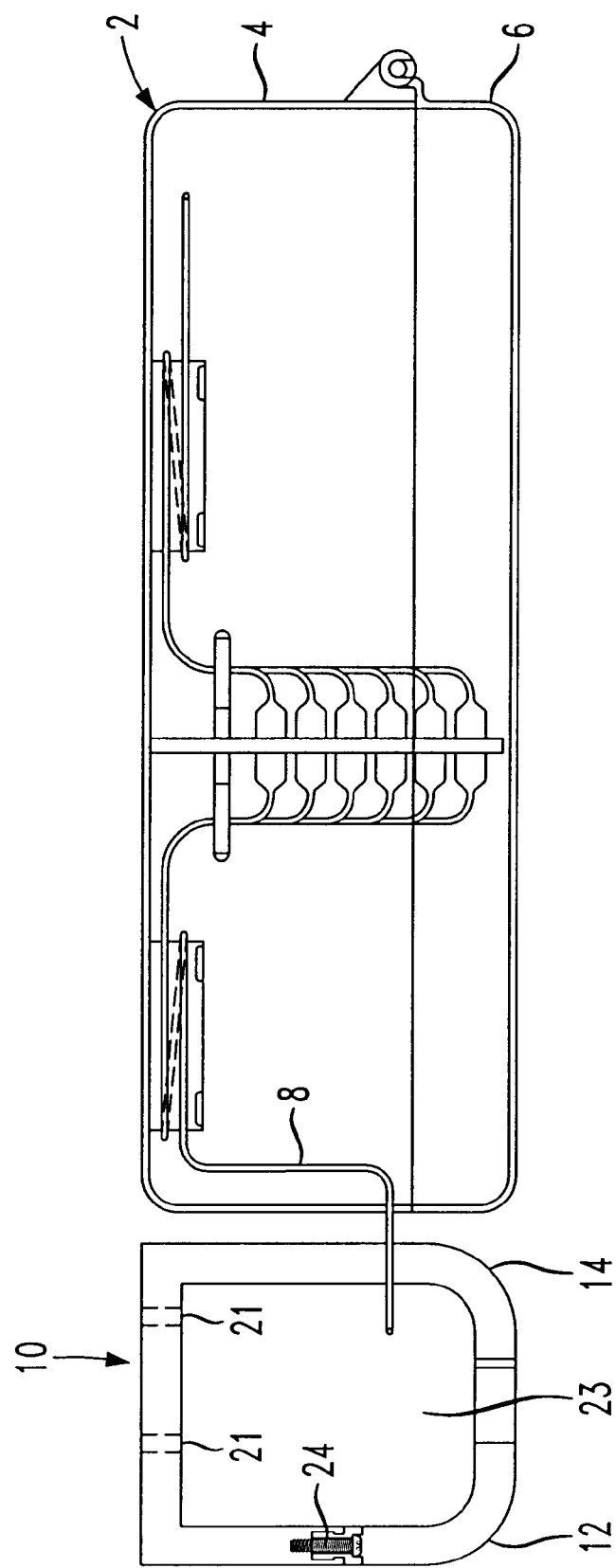
FIG. 1A is a top view of an exemplary secure trough and a closed building entrance protector (BEP) in accordance with the present invention.
Figure 1B:
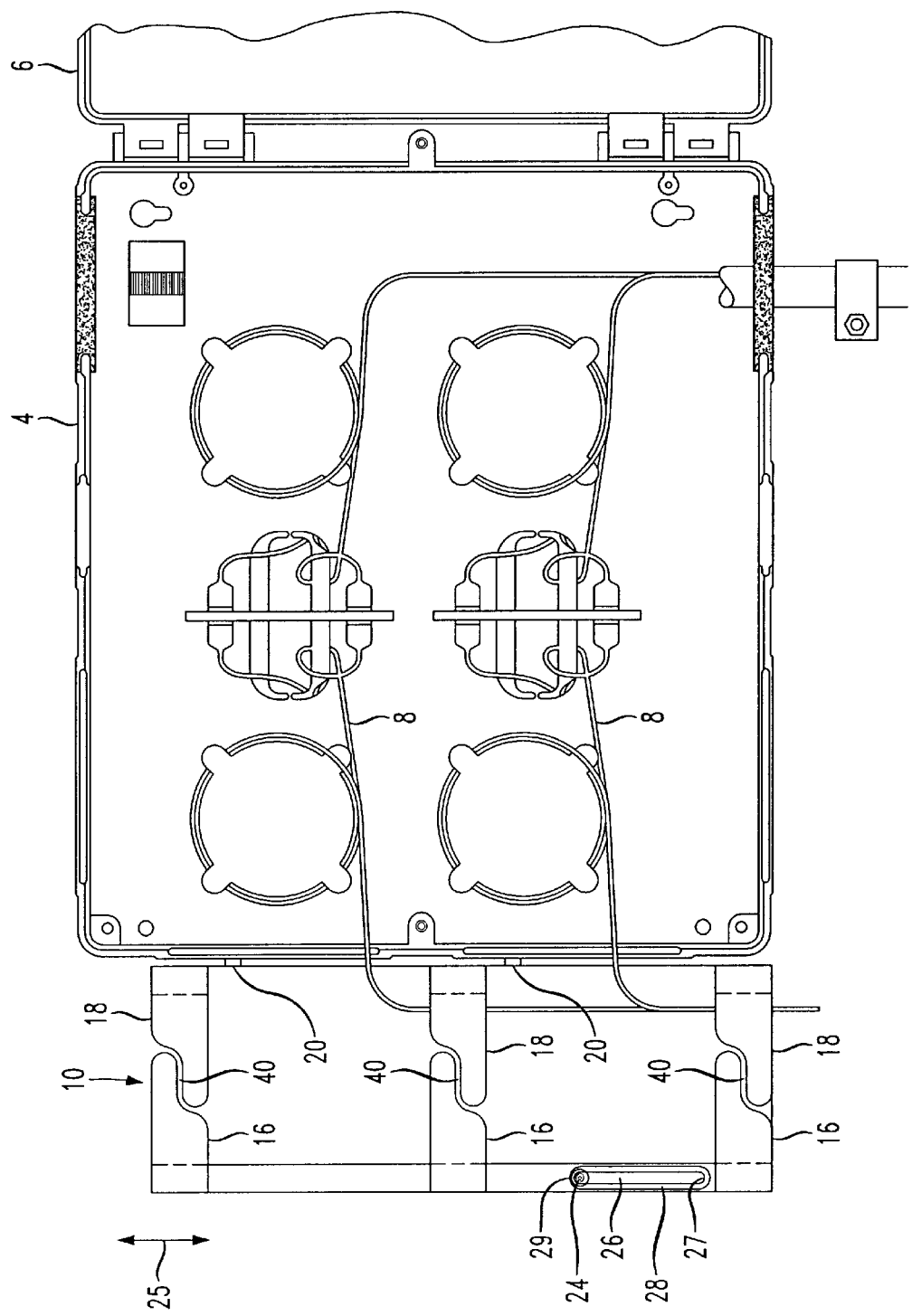
FIG. 1B is a front view of FIG. 1A with the BEP open.

FIG. 1A is a top view of an exemplary secure trough 10 and a closed building entrance protector (BEP) 2 in accordance with the present invention. FIG. 1B is a front view of FIG. 1A with the BEP 2 open. BEP 2 comprises a cover 6 and a base 4. Access to the portion of cables 8 within BEP 2 is achieved by opening cover 6. Typically, cover 6 is securely fastened to base 4, and a technician uses a tool (e.g., screwdriver, wrench, KS-type tool, 216-type tool) to unlock the cover 6. BEP 2 is typically mounted to a wall or equipment cabinet.

Secure trough 10 provides a secure (e.g., lockable) cable guide for routing cables 8 to various locations, such as other BEPs, other portions of a building, and out of or into a building. Secure trough 10 comprises a tray 14 and a retaining member 12. Retaining member 12 is slideably engaged with tray 14 to allow retaining member 12 to slide up and down in the directions of arrow 25 with respect to tray 14. The tray 14 comprises several retaining arms 18 and retaining member 12 comprises several retaining arms 16. The tray 14, retaining member 12, and retaining arms 16 and 18 form a cavity 23 for housing the cables 8. Cables 8 are positioned within cavity 23 and routed to various desired locations. In alternate embodiments of the invention, trough 10 is mounted to either a wall, to BEP 2, or both, by any appropriate means known in the art such as bolt mounted, screw mounted, riveted, anchored, adhesively mounted, or combination thereof. Mounting of trough 10 to a wall is facilitated by openings 21 and to BEP 2 by openings 20.

Access to cables 8 housed within trough 10 is achieved by adjusting the gap 40 between retaining arms 16 and 18. Retaining arms 16 and 18 are offset and overlap to form gap 40. Widening gap 40 allows access to cables 8 within trough 10 to perform activities such as cable maintenance and repair, inserting cables into trough 10, and extracting cables 8 from trough 10. Reducing gap 40 tends to prevent tampering of cables 8 by limiting access to cables 8 housed in trough 10. Also, reducing gap 40 tends to prevent cables 8 retained in trough 10 from inadvertently falling out of the cavity 23. Retaining arms 16 and 18 may be flexible to facilitate access to cables 8 housed in trough 10, but flexibility is not a requirement. Retaining arms 16 and 18 may also be rigid without hampering the functionality of trough 10.

Retaining member 12 is slideably attached to tray 14 by fastening mechanism 24. Fastening mechanism 24 is loosened to facilitate sliding of retaining member 12. Fastening mechanism 24 is tightened (e.g., locked) to fix the relative position of retaining member 12 with respect to tray 14 and accordingly fix the width of gap 40. Fastening mechanism 24 attaches retaining member 12 to tray 14 through slotted counter sink 28 and slotted open channel 26. Retaining member 12 may be slid upward, in the direction of the upper arrowhead of arrow 25, until the bottom 27 of slotted open channel 26 contacts fastening mechanism 24. At this point, gap 40 is at its maximum width. Retaining member 12 may be slid downward, in the direction of the bottom arrowhead of arrow 25, until the top 29 of slotted open channel 26 contacts fastening mechanism 24 (top 29 of slotted open channel 26 is hidden from view by fastening mechanism 24 in FIG. 1B). At this point, gap 40 is at its minimum width.

BEP 2 is an example of one type of enclosure that may be used with secure trough 10. Other types of enclosures having cables protruding through their walls may be used. Cables 8 may be any of various types of cables such as fiber optic cables, twisted pairs of copper wires, cables comprising other electrically conductive materials (e.g., ceramic, other conductive metals), or any combination thereof. Although the figures herein depict trough 10 comprising several pairs of retaining arms 16 and 18, in an alternate embodiment of the invention, trough 10 comprises a single pair of retaining arms 16 and 18 without compromising functionality.

Figure 2:
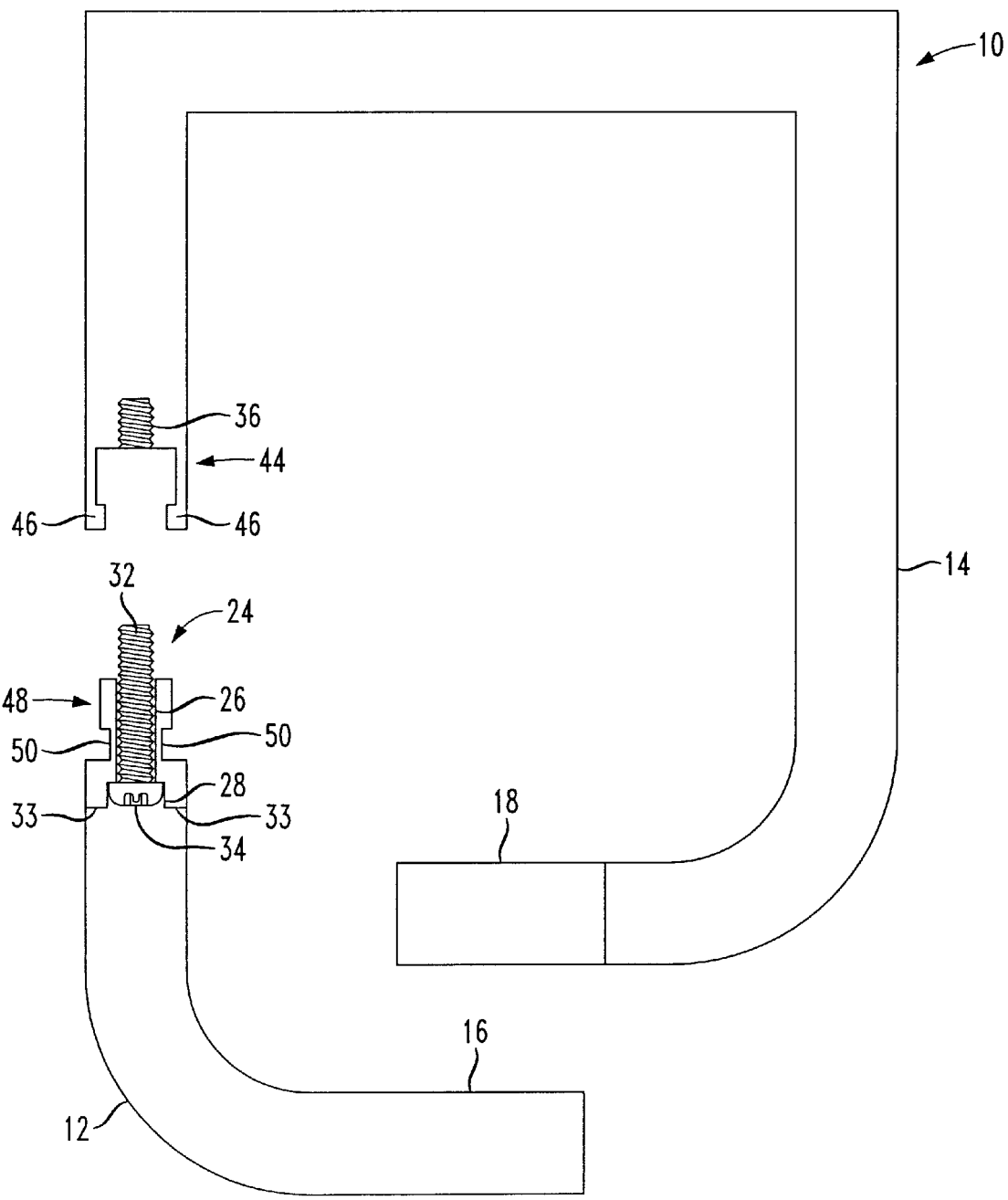
FIG. 2 is an exploded top view of an exemplary trough in accordance with the present invention.

FIG. 2 is an exploded top view of an exemplary trough 10 in accordance with the present invention. Retaining member 12 comprises slotted countersink 28 having a slotted open channel 26. Fastening mechanism 24 comprises shaft 32 and head 34. The diameter of head 34 is larger than the diameter of the shaft 32. The width of the slotted countersink 28 is larger than the diameter of the head 34 thus allowing fastening mechanism 24 to be recessed in the countersink 28 such that head 34 is flush with the outer edges 33. Although, in alternate embodiments of the invention head 34 is not flush with edges 33, such that head 34 protrudes beyond edges 33 or head 34 is recessed more deeply into slotted countersink 28. The width of the slotted open channel 26 is smaller than the diameter of the head 34 and is larger than the diameter of the shaft 32. Thus, fastening mechanism 24 is inserted into slotted countersink 28, with shaft 32 protruding through slotted open channel 26. Tray 14 comprises receiving portion 36. To fasten retaining member 12 to tray 14, the shaft 32 of fastening mechanism 24 is engaged with receiving portion 36. In an exemplary embodiment of the invention, receiving portion 36 is threaded to receive threaded shaft 32.

In an alternate embodiment of the invention, tray 14 comprises female portion 44 having rails 46, and retaining member 12 comprises male portion 48 having slots 50. Retaining member 12 is slideably engaged with tray 14 by inserting male portion 48 into female portion 44. Male portion 50 and female portion 44 are conformally fitted to allow rails 46 to ride within slots 50. Thus, in alternate embodiments of the invention, trough 10 comprises male portion 48 and female portion 44 without fastening mechanism 24, trough 10 comprises fastening mechanism 24 without male portion 48 and female portion 44, and trough 10 comprises fastening mechanism 24, male portion 48, and female portion 44.

Fastening mechanism 24 may be any type of fastening mechanism capable of slideably attaching retaining member 12 to tray 14. For example, fastening mechanism may be a bolt, a slotted head screw, a Phillips head screw, or a security screw. Security screws, as know in the art, require a special tool compatible with the security screw to disengage and lock the fastening mechanism. Examples of security screws include KS-type screws and 216-type screws. The use of a security screw provides security by preventing access to cables housed in trough 10 unless the person attempting access has a compatible tool.

Figure 3A:
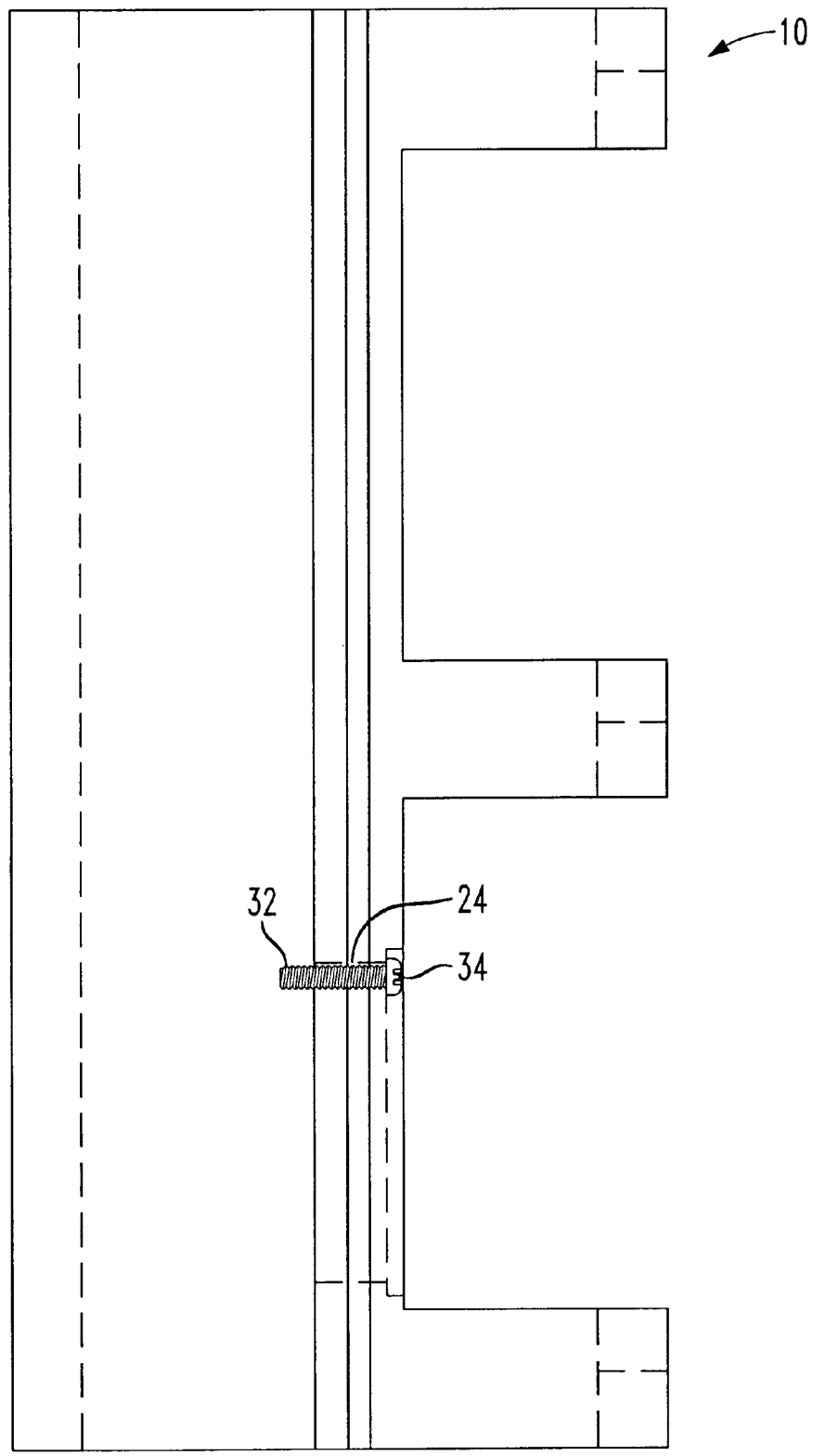
FIG. 3A is a side view of an exemplary embodiment of trough having a minimum width gap, in accordance with the present invention.
Figure 3B:
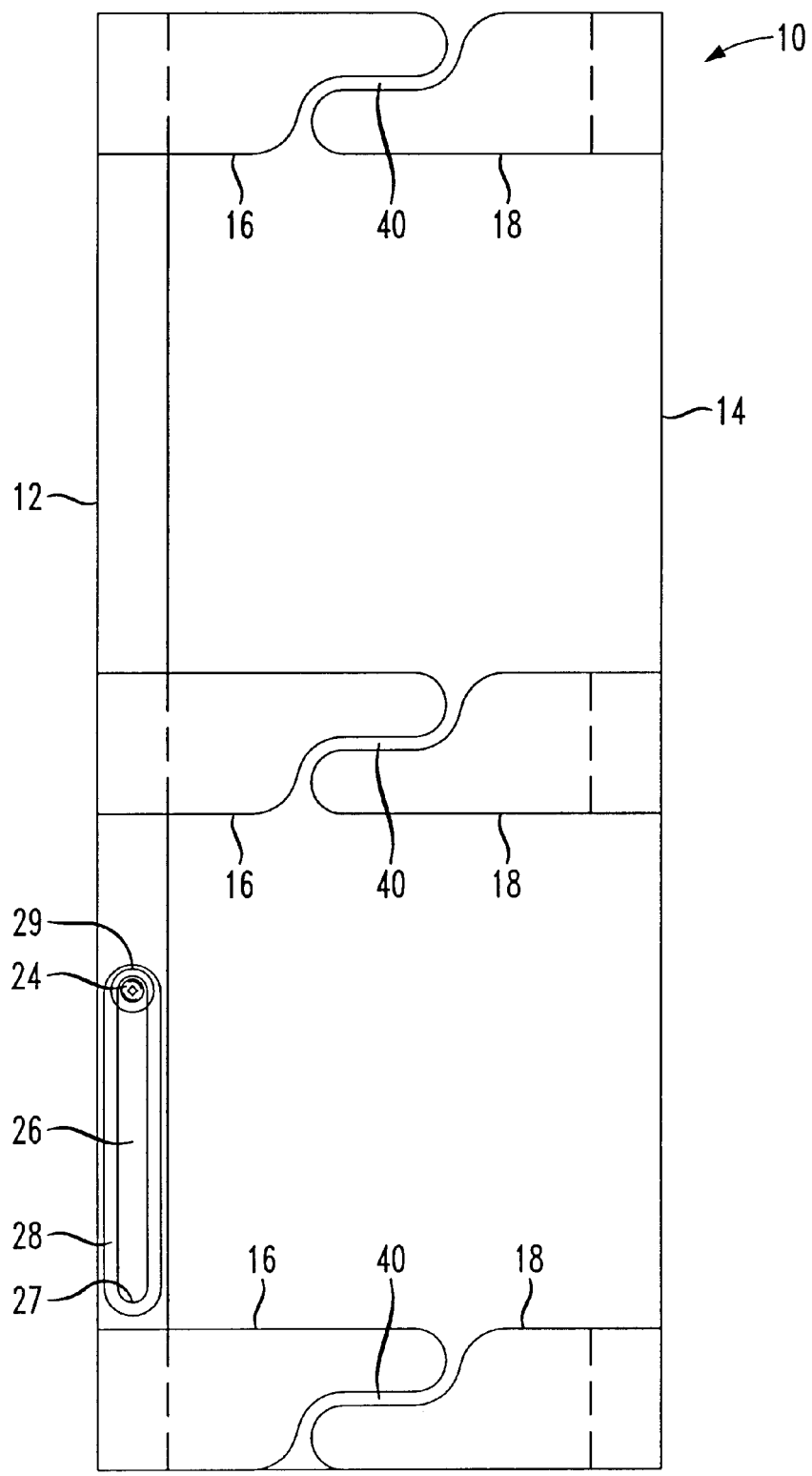
FIG. 3B a front view of the trough in FIG. 3A.

FIGS. 3A and 3B are a side view and a front view, respectively, of an exemplary embodiment of trough 10 having a minimum width gap 40, in accordance with the present invention. In FIGS. 3A and 3B, retaining member 12 is positioned such that the top 29 of slotted open channel 26 is in contact with fastening mechanism 24. This relative positioning between tray 14 and retaining member 12 results in gap 40 being at its minimum width. In an exemplary embodiment of the invention, retaining arms 16 and 18 touch, thus reducing the width of gap 40 to zero. Retaining arms 16 and 18 are not required to touch for trough 10 to securely retain cables 18. Trough 10 may be fabricated to provide any desired minimal gap width. This minimum gap width is obtained when fastening mechanism 24 is in contact with the top 29 of slotted open channel 26.

Figure 4A:
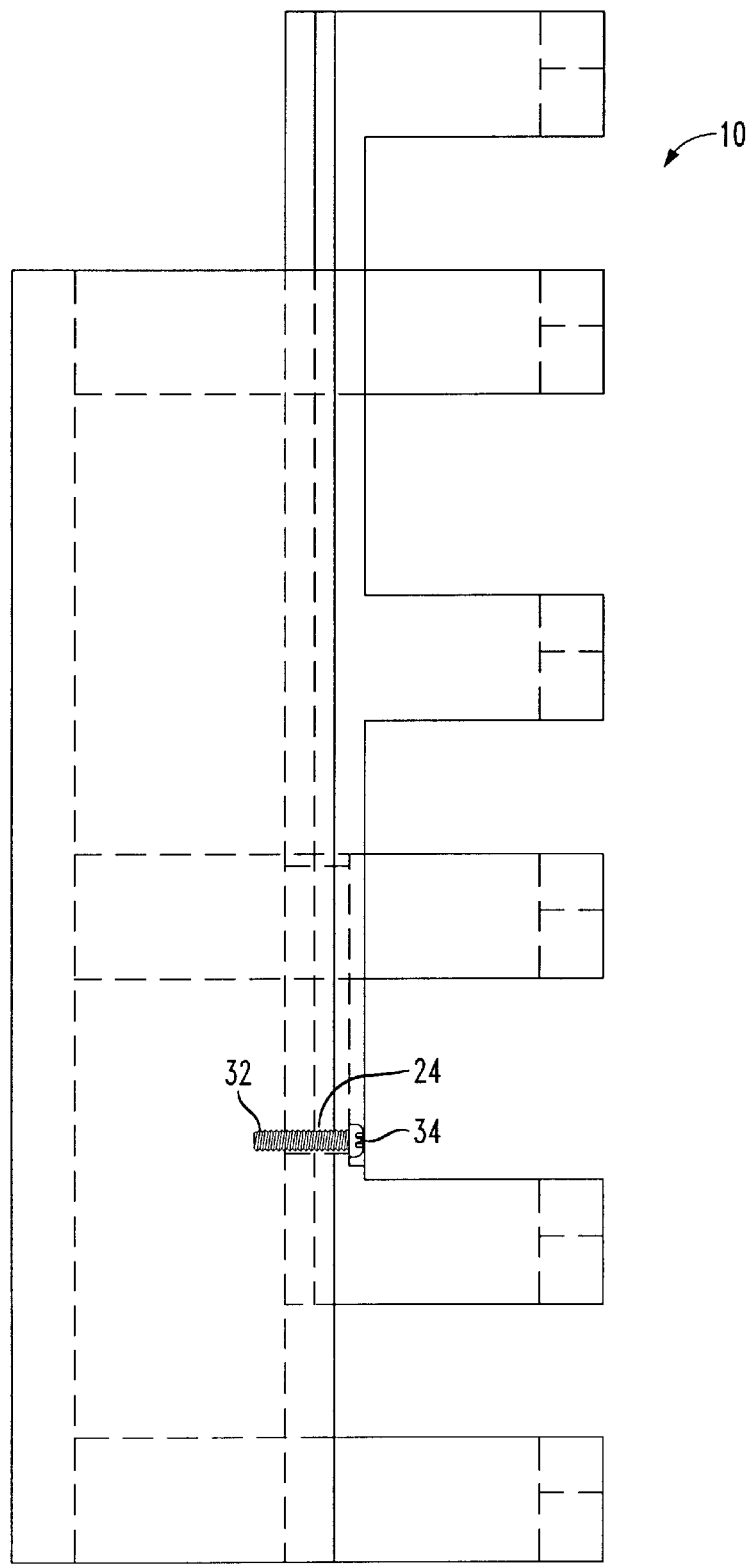
FIG. 4A is a side view of an exemplary embodiment of trough having a maximum width gap, in accordance with the present invention.
Figure 4B:
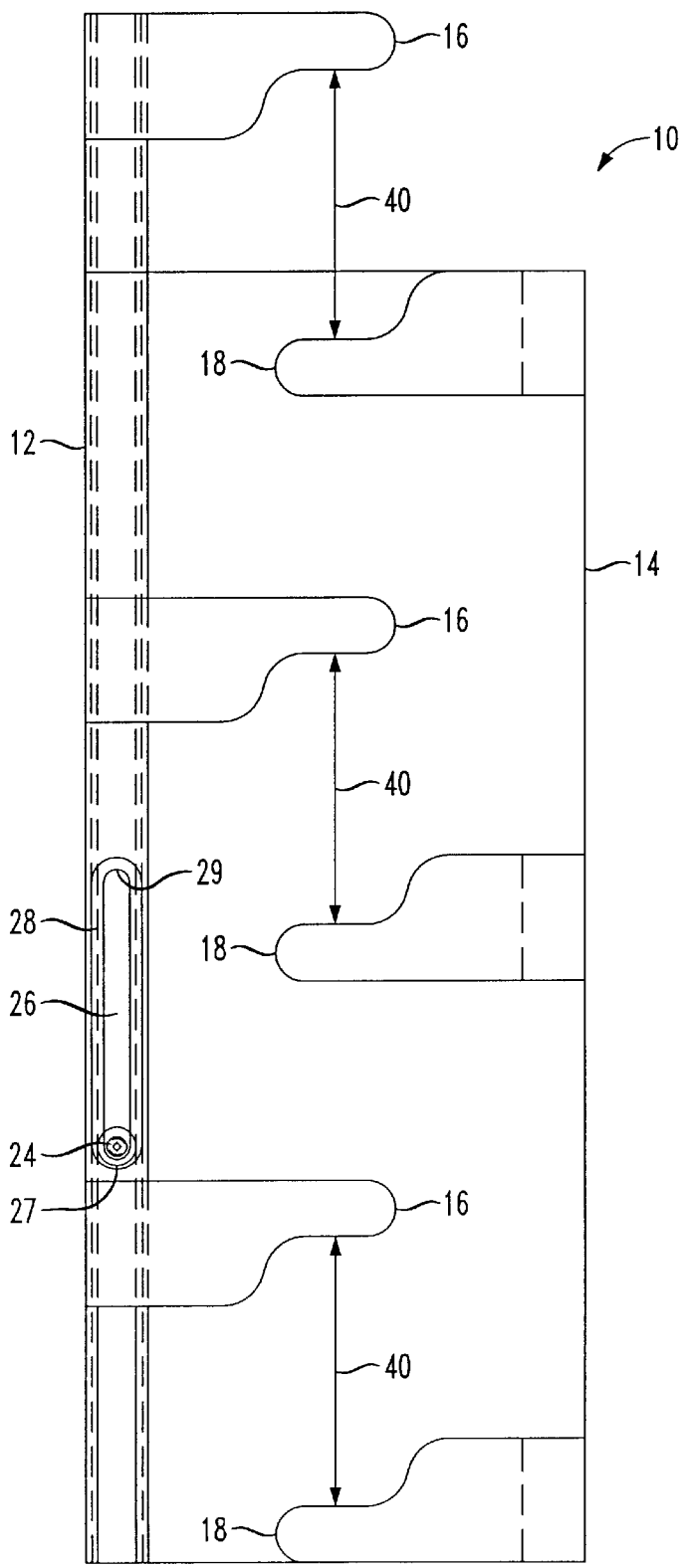
FIG. 4B front view of the trough in FIG. 4A.

FIGS. 4A and 4B are a side view and a front view, respectively, of an exemplary embodiment of trough 10 having a maximum width gap 40, in accordance with the present invention. In FIGS. 4A and 4B, retaining member 12 is positioned such that the bottom 27 of slotted open channel 26 is in contact with fastening mechanism 24. This relative positioning between tray 14 and retaining member 12 results in gap 40 being at its maximum width. Trough 10 may be fabricated to provide any desired maximum gap width. This maximum gap width is obtained when fastening mechanism 24 is in contact with the bottom 27 of slotted open channel 26.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

Figure 5:
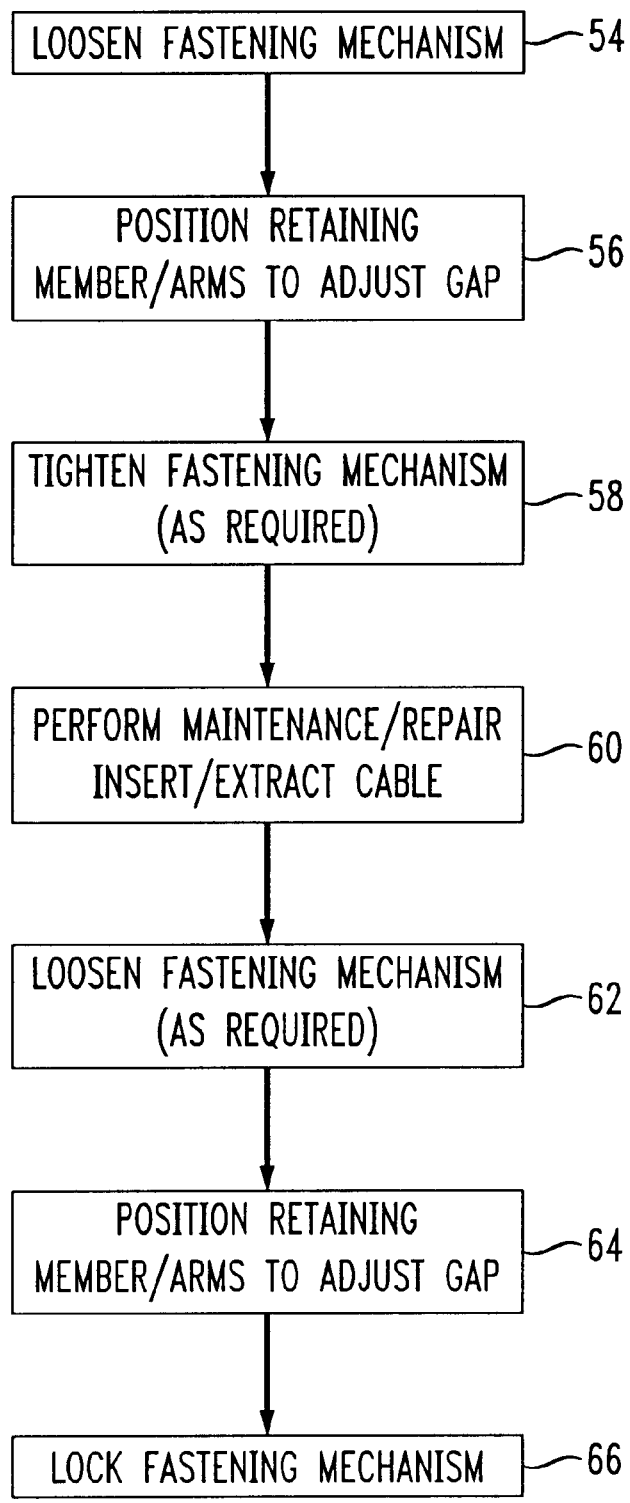
FIG. 5 is an exemplary flow diagram of a process for securely retaining cables in accordance with the present invention.

FIG. 5 is an exemplary flow diagram for a process of securely retaining cables 8 in trough 10 in accordance with the present invention. In step 54, adjustable fastening mechanism 24 is loosened to allow retaining member 12 to be slideably positioned with respect to tray 14. The adjustable fastening mechanism 24 may be loosened with any compatible tool, such as a Phillips head screwdriver, a slotted head screwdriver, an Allen wrench, a fixed or adjustable wrench, a ratchet, a security screw tool (e.g., KS-type screw tool, 216-type screw tool), or any combination thereof. Retaining member 12 is positioned, which also positions retaining arms 16 and 18, to adjust the width of gap 40 sufficiently to allow access to cables 8 (step 56). Depending upon the nature of the tasks to be performed, fastening mechanism 24 may be tightened to fix the width of gap 40 (step 58). If the task to be performed is, for example, a simple visual inspection of the cables 8 in trough 10, retaining member 12 may be held in place by hand during the visual inspection, thus not requiring tightening of fastening mechanism 24. If the task to be performed is more complex, fastening mechanism 24 may be tightened by any appropriate means (e.g., compatible tool, by hand) to fix the width of gap 40. The tasks are performed in step 60. The tasks may comprise any combination of maintenance, repair, or inspection of cables 8 and/or trough 10, and insertion and/or extraction of cables from trough 10. If fastening mechanism 24 was tightened to perform the tasks, then fastening mechanism 24 is loosened by any appropriate means in step 62. Retaining member 12 is positioned, which in turn positions retaining arms 16 and 18, to adjust the width of gap 40 sufficient to secure cables 8 in trough 10 in step 64. Fastening mechanism 24 is locked by any appropriate means, such as a compatible tool, in step 66.

Retaining cables 8 in secure trough 10 prevents unauthorized access of cables 8 retained in trough 10. Authorized access is available only to persons having a tool compatible with fastening mechanism 24. Prevention of unauthorized access tend to prevent tampering of the cables 8 retained in trough 10, such as wire tapping, and vandalism. Further, various size cables or bundles of cables can be accommodated by trough 10, simply by adjusting the width of gap 40.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A secure cable trough comprising:
   a tray comprising a first retaining arm;
   a retaining member comprising a second retaining arm, said retaining member being slideably engaged to said tray, said first retaining arm, said second retaining arm, said tray, and said retaining member defining a cavity for housing at least one cable, said first retaining arm and said second retaining arm extending toward each other, said first retaining arm and said second retaining arm being offset and overlapping, said first retaining arm and said second retaining arm creating an adjustable gap for providing access to said at least one cable and for inserting and extracting at least one of said at least one cable, said first retaining arm and said second retaining arm inhibiting cables housed within said cavity from inadvertently falling out of said cavity; and
   an adjustable fastening mechanism for slideably engaging and locking said retaining member to said tray, and for defining a relative position between said tray and said retaining member, wherein:
      a size of said gap is in response to said relative position between said tray and said retaining member;
      a size of said cavity for housing said at least one cable is independent of an adjusted configuration of said fastening mechanism; and
      said adjustable fastening mechanism facilitates prevention of unauthorized access to said at least one cable.

2. A trough in accordance with claim 1 further comprising a plurality of first and second retaining arms.

3. A trough in accordance with claim 1, said retaining member comprising a male portion having a pair of rails, said tray comprising a female portion having a pair of slots, wherein said retaining member is slideably engaged with said tray by inserting said male portion into said female portion, said male portion and said female portion being conformally fitted to allow said pair of rails to ride within said pair of slots.

4. A trough in accordance with claim 1, wherein said retaining member comprises a slotted countersink and said fastening mechanism comprises a shaft, said shaft passing through said slotted countersink and mating with said tray to slideably engage said tray to said retaining member.

5. A trough in accordance with claim 4, wherein said fastening mechanism comprises a head having a diameter larger than a diameter of said shaft, said slotted countersink having a width larger than said diameter of said head, said slotted countersink having a slotted open channel having a width smaller than said diameter of said head and larger than said diameter of said shaft.

6. A trough in accordance with claim 5, said countersink comprising outer edges, wherein said head is flush with said outer edges.

7. A trough in accordance with claim 5, wherein the relative position between said tray and said retaining member is achieved by loosening said adjustable fastening mechanism, such that said head clears said slotted countersink to allow said shaft to slide along said slotted open channel.

8. A trough in accordance with claim 1, wherein said adjustable fastening mechanism is loosened and said relative position between said tray and said retaining member is adjusted to provide said gap between said first retaining arm and said second retaining arm, sufficient to allow insertion and extraction of at least one cable into and from said cavity.

9. A trough in accordance with claim 1, wherein said relative position between said tray and said retaining member is adjusted to provide a gap sufficient to inhibit cables housed within said cavity from inadvertently falling out of said cavity, and said fastening mechanism is locked to fix the relative position between said tray and said retaining member and to secure said at least one cable housed in said cavity.

10. A trough in accordance with claim 1, wherein said fastening mechanism is a security screw.

11. A trough in accordance with claim 1, wherein said fastening mechanism is selected from the group consisting of a bolt, a KS-type screw, a 216-type screw, a slotted head screw, an Allen head screw, and a Phillips head screw.

12. A trough in accordance with claim 1, wherein said tray is adapted to be mounted to at least one of a wall and a building entrance protector.

13. A trough in accordance with claim 1, wherein said cables are at least one of fiber optic cables and electrically conducting cables.

14. A method for accessing and securely retaining cables in a cavity defined by a tray and a retaining member, said method comprising the steps of:
   loosening an adjustable fastening mechanism for slideably engaging said retaining member to said tray, said tray comprising a first retaining arm, said retaining member comprising a second retaining arm, said first retaining arm and said second retaining arm extending toward each other, said first retaining arm and said second retaining arm being offset and overlapping, said first retaining arm and said second retaining arm creating an adjustable gap; wherein:

said adjustable fastening mechanism facilitates prevention of unauthorized access to said cables;

positioning said retaining member relative to said tray to provide said gap sufficient to allow insertion and extraction of at least one cable to and from a cavity;

performing at least one of inserting and extracting said at least one cable into and from said cavity;

positioning said retaining member relative to said tray to provide said gap sufficient to inhibit cables housed within said cavity from inadvertently falling out of said cavity; and locking said adjustable fastening mechanism to secure said cables housed within said cavity, wherein:
 a size of said cavity for housing said at least one cable is independent of an adjusted configuration of said fastening mechanism.

15. A method in accordance with claim 14 further comprising the step of mounting said tray to at least one of a wall and a building entrance protector.

16. A method in accordance with claim 14, wherein said steps of loosening and locking comprises loosening and locking with a tool compatible with said adjustable fastening mechanism.

17. A method in accordance with claim 14, wherein said fastening mechanism is selected from the group consisting of a bolt, a screw, and a security screw.

18. An assembly for securely retaining telecommunication cables, said assembly comprising:

a plurality of pairs of retaining arms, each pair of retaining arms comprising a first retaining arm and a second arm;

a tray mounted to at least one of a wall and a building entrance protector, said tray comprising said first retaining arms;

a retaining member comprising:
 a slotted countersink, said slotted countersink having a slotted open channel; and
 said second retaining arms, said retaining member being slideably engaged to said tray, said plurality of pairs of retaining arms, said tray, and said retaining member defining a cavity for housing said cables, each first retaining arm and second retaining arm of each of said plurality of pairs of retaining arms extending toward each other, each first retaining arm and second retaining arm of each of said plurality of pairs of retaining arms being offset and overlapping, each first retaining arm and second retaining arm of each of said plurality of pairs of retaining arms creating an adjustable gap for providing access to said cables and inserting and extracting said cables, each first retaining arm and second retaining arm of each of said plurality of pairs of retaining arms inhibiting cables housed within said cavity from inadvertently falling out of said cavity; and a security screw for slideably engaging and locking said retaining member to said tray, and for defining a relative position between said tray and said retaining member, a size of said gap being in response to said relative position between said tray and said retaining member, said security screw comprising a shaft and a head, said shaft passing through said slotted countersink and said slotted open channel for mating with said tray to slideably engage said tray to said retaining member, said head having a diameter larger than a diameter of said shaft, said slotted countersink having a width larger than said diameter of said head, said slotted open channel having a width smaller than said diameter of said head and larger than said diameter of said shaft, wherein:

the relative position between said tray and said retaining member is achieved by loosening said security screw, such that said head clears said slotted countersink to allow said shaft to slide within said slotted open channel, said relative position between said tray and said retaining member is adjusted to provide said gap between said first retaining arms and said second retain arms sufficient to allow insertion and extraction of said cables into and from said cavity, said relative position between said tray and said retaining member is adjusted to provide a gap sufficient to inhibit cables housed within said cavity from inadvertently falling out of said cavity, and said security screw is locked to fix the relative position between said tray and said retaining member and to secure said cables housed in said cavity.

* * * * *